UNITED STATES PATENT OFFICE.

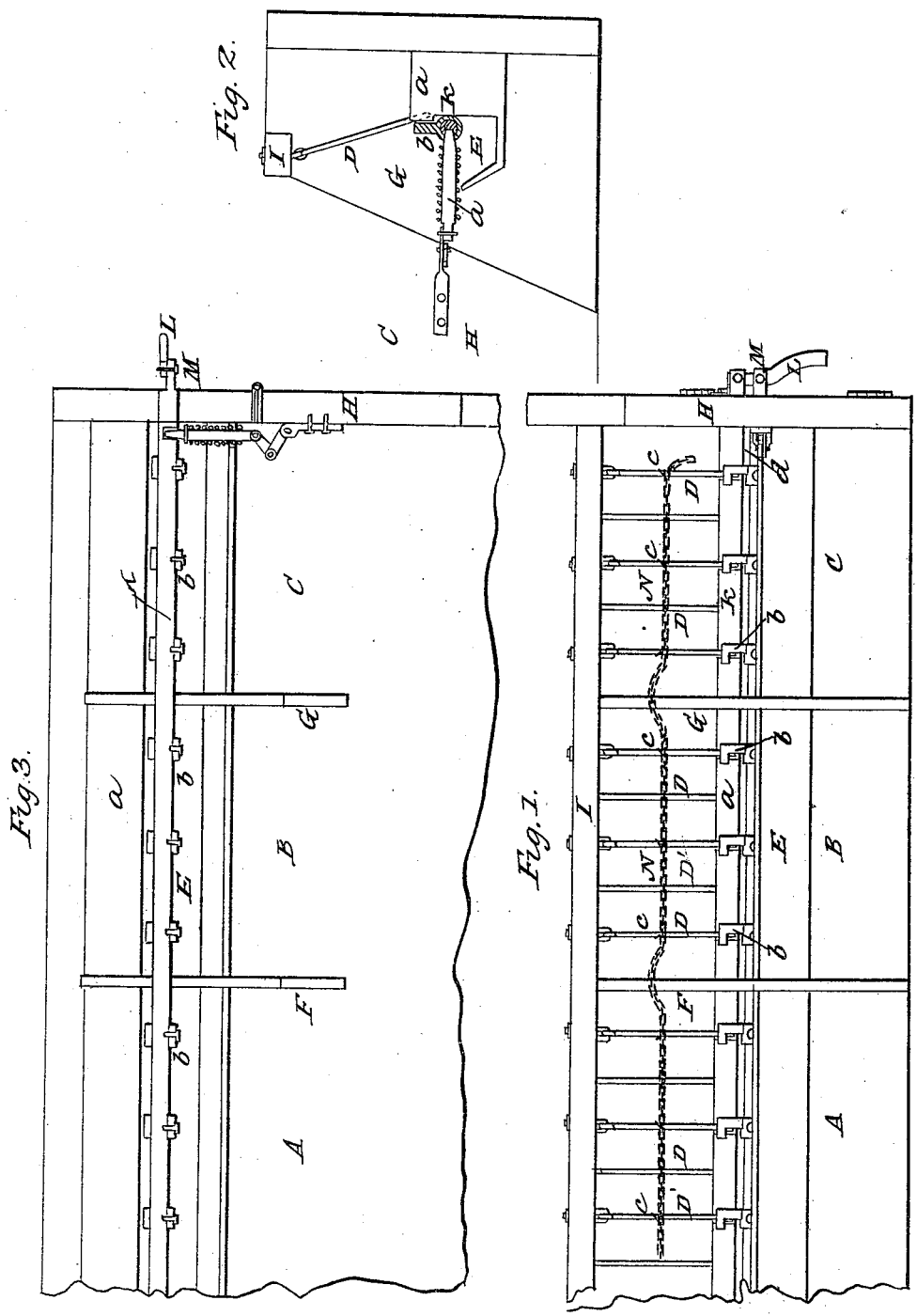

EMERY N. MOORE, OF BOSTON, MASSACHUSETTS.

RELEASING HORSES, &c., FROM STABLES IN CASE OF FIRE, &c.

Specification of Letters Patent No. 5,583, dated May 16, 1848.

*To all whom it may concern:*

Be it known that I, EMERY N. MOORE, of Boston, in the county of Suffolk and State of Massachusetts, have invented a new and useful Improvement by which Horses or Cattle may be Expeditiously Removed from Stables when on Fire; and I do hereby declare that the same is fully described and represented in the following specification and accompanying drawings, letters, figures, and references thereof.

Of said drawings Figure 1, denotes a front elevation of a series of three stalls and feeding racks, having my improvement applied to them. Fig. 2, is a transverse vertical section of the same. Fig. 3, is a horizontal section of the same, taken through the long bolt or locking bar and door, to be hereinafter described.

In said drawings A, B, C, are the stalls on one side of a stable.

D, D', D, D', D, are the bars of the hay rack of each stall.

E is the grain trough thereof. F, G, are the partitions between the stalls.

H is the stable door.

Three or any other suitable number of the hay rack bars D, D, D, are hinged or so jointed to the longitudinal beam I, as to be capable of being moved outwards (or toward the horse in the stable). The lower ends of these bars, are not fastened into the bottom part $a$, of the hay rack, like those of the other bars, but are respectively made, merely to enter recesses made therein, or in the front side thereof.

K is a long locking or bolt bar, which is made to extend transversely through the entire range of stalls, and one side of the building. It should be supported in bearings so as to be capable of being moved or slid back and forth a short distance in longitudinal direction. It is placed at the rear part of the feeding troughs, and directly underneath the end of the several rack bars D, D', D, &c., as seen in the drawings. A series of small studs or projections $b$, $b$, &c. is fixed on the locking bar, there being one of said projections to each of the hinged or moveable rack bars D, D, &c., each of said studs being so placed on the bar K, as when said rod or bar is forced backward to project in front of the lower end of the movable rack bar, and confine it in its recess. A hand lever L, is fixed on the outer or forward end of the rod K, the said lever being made to turn on a fulcrum at M.

In connection with the aforedescribed mechanism I employ a long chain N, which extends through all the stalls, and around their several partitions F, G, and has a series of rings $c$, $c$, $c$, &c., attached to it. The several movable bars are passed respectively through the rings, before they are turned down, and locked into their sockets. The chain thus becomes stretched along from stall to stall, each horse being attached to it, by a chain halter. The horses being so attached to the chain, and the bars D, D, &c., being confined in their sockets, if a person applies his hand to the lever L, and draws the locking bar K forward, so as to remove all the studs $b$, $b$, &c., from their positions in front of the sockets of the bars D, D, &c., the several bars D, D, &c., will be left free to fall forward, out of their sockets. Then if the said person pulls upon the forward end of the chain N, the rings of the chain will slip off from the movable bars D, D, &c., and enable him to draw all the horses in the series of stalls, out of the stable door. In order that the horses may not be set free, without the stable door first being opened, I make use of a spring bolt $d$, which should be so connected with the locking bar K, and door that when the door is closed the end of the bolt may be made to pass into a cavity in the locking bar, and prevent it from being drawn forward. The bolt may be so connected with the door by a chain or other proper contrivance, that when the door is being opened it will withdraw the bolt, and free the locking bar.

What I claim as my invention is—

The combination of the chain N, locking bar K, (having studs $b$, $b$) and the movable bars D, D, &c., or their mechanical equivalents, the whole being arranged and made to operate together, substantially in manner and for the purpose as above specified.

In testimony whereof I have hereto set my signature this eleventh day of August A. D. 1847.

EMERY N. MOORE.

Witnesses:
R. H. EDDY,
CALEB EDDY.